United States Patent [19]

Muhrer et al.

[11] Patent Number: 4,928,523

[45] Date of Patent: May 29, 1990

[54] METHOD AND APPARATUS FOR IDENTIFYING BALLISTIC CHARACTERISTICS WITHIN A WEAPON BARREL

[75] Inventors: Gerhard Muhrer; Reinhard Pannold; Reinhard Boschanig, all of Graz, Austria

[73] Assignee: AVL Gesellschaft fur Verbrennungskraftmaschinen und Messtechnik m.b.H. Prof. Dr.Dr.h.c. Hans List, Austria

[21] Appl. No.: 319,098

[22] Filed: Mar. 3, 1989

[30] Foreign Application Priority Data

Mar. 4, 1988 [AT] Austria ................................. 575/88

[51] Int. Cl.⁵ .............................................. G01L 5/14
[52] U.S. Cl. .................................... 73/167; 333/113; 342/127
[58] Field of Search ..................... 73/167, 147; 89/6.5; 346/38; 333/109, 110

[56] References Cited

U.S. PATENT DOCUMENTS

| | | | |
|---|---|---|---|
| 2,679,631 | 5/1954 | Korman et al. | 333/113 |
| 2,691,761 | 10/1954 | Smith, Jr. | 73/167 X |
| 2,735,981 | 2/1956 | Schutz et al. | 73/167 X |
| 2,748,350 | 5/1956 | Miller | 333/113 |
| 3,659,201 | 4/1972 | Vogelsang | 73/167 |
| 3,918,061 | 11/1975 | Elgaard | 73/167 X |
| 4,283,989 | 8/1981 | Toulious et al. | 73/167 X |

Primary Examiner—Daniel M. Yasich
Attorney, Agent, or Firm—Hill, Van Santen, Steadman & Simpson

[57] ABSTRACT

An apparatus and method for identifying the path/time relationships of a projectile within a weapon barrel, even upon live firing, includes a coupling element having at least two openings in a sidewall thereof through which a generated electromagnetic wave is divided and then introduced into the barrel. The divided wave includes wave parts that propagate toward and away from the barrel, the parts propagating toward the barrel adding up and being introduced into the barrel while the parts propagating away from the barrel cancel each other out. The wave reflects off from the projectile and is then received after undergoing an inverse division.

21 Claims, 2 Drawing Sheets

EVALUATION UNIT
AND WAVE GENERATOR 4,928,523

METHOD AND APPARATUS FOR IDENTIFYING BALLISTIC CHARACTERISTICS WITHIN A WEAPON BARREL

BACKGROUND OF THE INVENTION

The present invention generally relates to projectile velocity measuring apparatus and methods and, more particularly, to electromagnetic wave Doppler muzzle velocity measuring apparatus and methods employing at least part of a weapon barrel as a waveguide.

Yet, more particularly, the invention is directed to projectile velocity measuring apparatus and methods, wherein an electromagnetic wave is coupled to and introduced into the barrel of a weapon via a waveguide connector connected to the muzzle of the barrel and an electromagnetic wave reflected off of a projectile positioned within the barrel is received from the barrel, the phase relationship between the introduced and received waves changing as the position of the projectile changes so as to serve as a measure of the position of the projectile within the barrel.

U.S. Pat. No. 4,283,989, the disclosure of which is incorporated herein, discloses such a method and apparatus. The disclosed apparatus is employed for identifying the speed and acceleration of a projectile situated within a barrel of a weapon while still contained within the barrel. This allows identification of ballistic conditions within the barrel, of ammunition, or for correcting a delayed detonator in a projectile while taking into consideration the actual muzzle velocity of the projectile.

Generally, the apparatus and method employs electromagnetic waves in the microwave region (wavelengths in millimeters or centimeters), the wavelength employed depending on the caliber of the barrel of the weapon under evaluation. The barrel is employed as a waveguide for microwaves coupled thereto for introduction into the barrel. Different wave types or modes form in the waveguide depending on the frequency employed and the caliber of the barrel. In order to guarantee unambiguous measurements, the frequency of the microwave and the nature of the coupling of the microwaves to the barrel are selected so that only one wave type develops.

The projectile positioned within the barrel of the weapon acts as a sliding short circuiting component at which the introduced wave reflects so that a standing wave is formed within the barrel as a result of the superimposition of the introduced and reflected waves. When the projectile is fired, the projectile, in a sense, causes the standing wave to travel along the barrel in front of the projectile as the phase relationship between the introduced and reflected wave shifts or changes.

The phase shift produced by the motion of a fired projectile can be detected and identified by a suitable evaluation arrangement that measures Doppler frequencies. The apparatus outlay or hardware corresponds substantially to that of a low-power Doppler radar. However, there are a variety of adaptations necessary for coupling the wave to be introduced into the barrel to the barrel and to receive the reflected wave.

Early Doppler radar apparatus employed for determining projectile velocities used antennas, deflecting mirrors, and the like for introducing the waves into and receiving the waves out from the barrel. These components were always at least partially destroyed by a projectile emerging from the barrel upon firing. Accordingly, these are referred to as apparatus for destructive identification of ballistic characteristics within a barrel of a weapon. More recent apparatus, such as that disclosed in U.S. Pat. No. 4,283,989, employ components that are not destroyed by a fired projectile and, accordingly, are referred to herein as apparatus for nondestructive identification of ballistic characteristics within a barrel of a weapon.

There is no known system or apparatus in the marketplace that is usable in practice. With the known systems and apparatus, the mechanical stresses of the barrel that arise from firing of the projectile immensely influence the evaluation of the ballistic characteristics because the mechanical stresses create signals that are relatively high, while the levels of signals employed during the evaluation are relatively low.

Although signals that can be easily evaluated can be generated by the apparatus of the prior art, the useful or measurement signal substantially degrades upon a line firing. This occurs because the useful signal is overridden by disturbance signals having the same order of magnitude as the useful signal. Other reasons are noted in the disclosure of U.S. Pat. No. 4,283,989.

SUMMARY OF THE INVENTION

The present invention provides an improved method and apparatus for the nondestructive identification of ballistic characteristics within the barrel of a weapon so that meaningful evaluations are possible even upon line firing of the weapon. To this end, an apparatus embodying principles of the invention includes means for the introduction of electromagnetic waves into the barrel and receipt of electromagnetic reflected out of the barrel, wherein the waves are divided into parts prior to introduction into the barrel so that wave parts propagating toward the breech end of the barrel sum together, while wave parts propagating away from the barrel cancel out.

The invention is based on the consideration that in prior art devices, at least half of the energy of the electromagnetic wave introduced into the barrel is emitted from the muzzle of the barrel instead of propagating in the direction of the projectile in the barrel. The coupling elements for introducing the wave employed usually exhibit a very poor voltage-to-standing wave ratio. This means that only a relatively small part of the generated energy in fact propagates into the barrel and reflects at the top of the projectile. Due to mechanical stresses that arise upon firing of the projectile, the voltage-to-standing wave ratio is further changed and degraded as noise signals form that can easily reach or exceed to magnitude of the useful signal.

Accordingly, the present invention provides a method for identifying ballistic characteristics within a barrel of a weapon, wherein the wave to be introduced into the barrel is divided into wave parts that are supplied to the barrel from at least two spaced apart locations so that the wave parts propagating toward the projectile in the barrel add up, while the wave parts propagating in the opposite direction cancel out. Thus, the wave parts propagating into the barrel have such a phase relationship to each other as a consequence of the distance(s) between the locations, that a very defined unambiguous propagation of the wave to be introduced into the barrel is compelled. Nearly 100% of the wave energy generated is therefore actually introduced into the barrel of the weapon, so that potential disturbing signals remain negligible in comparison to the useful signal to be evaluated, even upon line firing of a projectile. The present invention also provides in an embodiment, an apparatus for practicing the method above, wherein a coupling element includes at least two coupling openings positioned along the path volume traversed by a projectile in spaced apart fashion so that wave parts supplied through the openings propagating in the direction of the barrel add up, while the wave parts propagating in the opposite direction cancel out.

In a preferred embodiment, given identical propagation speeds and phase shifts for the individual wave parts, the apparatus is designed such that a distance L between the openings as measured along the axis of the barrel is selected to be a natural number multiple of the wavelength of the electromagnetic wave plus an additional one-quarter of the wavelength and follows the equation: $L = n \cdot \lambda + \lambda/4$, wherein $n = 0, 1, 2, \ldots$ and $\lambda$ is the wavelength. Due to the phase shift of the wave parts that cross over, it is assured that the wave introduced into the barrel cannot propagate in the direction opposite that of the barrel and the corresponding addition of wave parts deriving from the coupling openings ensues in the desired direction toward the projectile within the barrel.

Fundamentally, of course, the locations at which the electromagnetic wave is divided into wave parts and then supplied to the barrel can be provided at any arbitrary location along the wall of the barrel. To this end, the corresponding openings can be provided in the barrel. However, it has proven to be particularly advantageous to provide the coupling via a separate coupling element that can be placed at the muzzle of the barrel, as disclosed in U.S. Pat. No. 4,283,989. First, the need to adapt the barrel for secure attachment thereto of an element supplying an electromagnetic wave to the coupling openings is reduced or eliminated. Second, the placement of the coupling element at the end of the muzzle enables measurement of the projectile position along the entire length of the barrel, this being a problem with a wave coupling member attached nearer the breech of the barrel because of the high concentrations of free electrons that can appear behind a passing projectile as a consequence of chemical reactions between oxygen and hot gun powder gases and because of the influencing electromagnetic waves associated therewith.

Preferably, along the path volume traversed by the projectile, the coupling element attached to the barrel has a cylindrically shaped opening through which the projectile passes, which opening includes at a wall defining same the above-mentioned coupling openings, and which opening has a diameter that is larger than that of the barrel. A replaceable conical transition element preferably is placed between the barrel and the coupling element, the conical transition element having a conical opening therethrough to provide a transition opening between the interior of the barrel and the opening of the coupling element. This arrangement permits nondestructive passage of a projectile through the coupling element, while the conical transition element assures an optimal loss-free to low loss introduction of the wave into the barrel, even if undesired waves are generated. Insofar as the conical transition element is interchangeable, the coupling element can be attached to a variety of barrels of different calibers.

Accordingly, an advantage of the present invention is an improved method and an improved apparatus for identifying ballistic characteristics within a barrel of a weapon.

Another advantage is a method and an apparatus for identifying ballistic characteristics within a barrel of a weapon upon line firing of a projectile.

Yet another advantage is a method and an apparatus for identifying ballistic characteristics within a barrel of a weapon that is easily transferable to a variety of barrels of different calibers.

These and other advantages will become apparent from the following description of the preferred embodiments thereof, taken in conjunction with the accompanying drawings.

DETAILED DESCRIPTION OF THE PRESENTLY PREFERRED EMBODIMENTS

Figure 1:
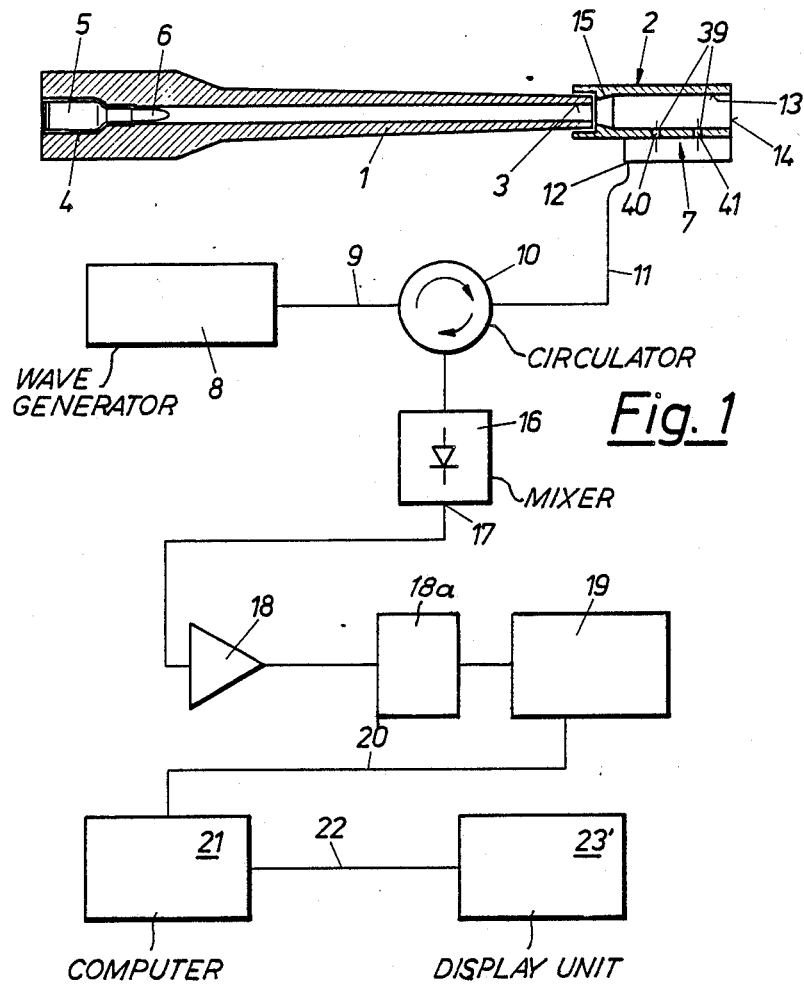
FIG. 1 is a block diagram of an apparatus embodying principles of the invention.

An apparatus embodying principles of the invention is illustrated in FIG. 1. The illustrated apparatus is employed to identify ballistic characteristics within a barrel 1 of a weapon, not illustrated further. The apparatus includes a coupling element 2 for connecting a waveguide connector 7 to a muzzle 3 of the barrel 1. It can be appreciated that the apparatus can be integrated into a variety of weapons as the only component which need vary from weapon to weapon is the coupling element 2.

In FIG. 1, a projectile cartridge 5 is positioned within a shell chamber 4 located at the breech end of the barrel 1. A projectile 6 extends from the cartridge 5 into the barrel 1 and is pointed toward the muzzle 3. The illustrated apparatus is adapted for identifying and evaluating the path/time relationship, i.e., speed and acceleration characteristics, of the projectile 6 as it travels within the barrel 1.

To this end, an electromagnetic wave is coupled to and introduced into the muzzle 3 of the barrel 1 via at least one waveguide connector 7 which is attached to the barrel 1 by means of the coupling element 2. The waveguide connector 7, as will become apparent below, is a waveguide-to-waveguide connector. After reflecting the projectile 6, the electromagnetic wave is received via the waveguide connector 7, a phase relationship between the introduced and received waves changing with a given change in the position of the projectile 6 within the barrel 1. The phase relationship thus serves as a measure of the position of the projectile 6 and, accordingly, the speed and acceleration of the projectile 6 can be determined taking into consideration passage of time.

An electromagnetic wave generator 8 is employed to generate microwaves having wavelengths in the millimeter or centimeter range, depending upon the caliber of the barrel 1. The generated wave is transmitted via a coaxial cable 9 to a circulator 10 from which, corresponding to the function thereof, the wave is transmitted to a coaxial waveguide connector 12 via a coaxial cable 11 and then into the barrel 1 via the coupling element 2. As an example, an H-type wave excited at the connector 12 is transmitted along the waveguide connector 7 into an inner region 13 of the coupling element 2 which serves as a cylindrical waveguide. Accordingly, the H-type wave is converted into a cylindrical-symmetrical $E_{01}$-wave.

The electromagnetic wave transmitted via the waveguide connector 7 is transmitted into the coupling element 2 via spaced apart locations 39, which preferably are spaced apart openings 40 and 41 which are in communication with the interior of the coupling element 2 and the interior of the waveguide connector 7. As a consequence, practically the entire wave is transmitted into the interior of the barrel 1 via conical transition opening 15 which communicates between the barrel 1 and the coupling element 2. The barrel 1 serves as a circular waveguide. The conical transition 15 is provided so that the interior 13 of the coupling element 2 can be made larger in diameter than the diameter of the interior of the barrel 1 to thus reduce the risk of reflections and the appearance of additional, undesired wave types at the point of transition into the barrel 1.

The reflected wave is received via the waveguide connector 7 and is transmitted via the coaxial waveguide connector 12 and the coaxial cable 11 to the circulator 10 where, due to the non-reciprocal behavior of the circulator 10, the reflected wave is extracted or decoupled from the wave generated by the generator 8, and then supplied to a mixer 16. Due to reflections and as a consequence of a finite blocking attenuation of the circulator 10, a fraction of the wave generated by the generator 8 is also supplied to the mixer 16 and thus, a mixing of the generated and reflected waves occurs.

A signal having the phase difference between the generated and reflected waves, or the Doppler frequency, is available at the output 17 of the mixer 16. The signal is stored in a transient memory 19 after appropriate amplification by an amplifier 18 and after conversion to a digital signal by an analog-to-digital converter 18a.

A computer 21, for example, a commercially available microcomputer, is in communication with the transient memory 19 via a connecting line 20. The computer 21 further processes the digital signal. An output unit 23', for example a plotter, is coupled to the computer 21 via a line 22 for displaying information.

As a consequence of the illustrated and described nature of the introduction of the waves into and reception of the waves out from the barrel 1 laterally at the muzzle end of the barrel 1, a completely non-destructive identification of the ballistic characteristics within the barrel 1 is possible, whereby the projectile 6 can be fired from the barrel 1 completely unimpeded, and any and all necessity for replacing or readjusting parts after every firing is eliminated.

Figure 2:
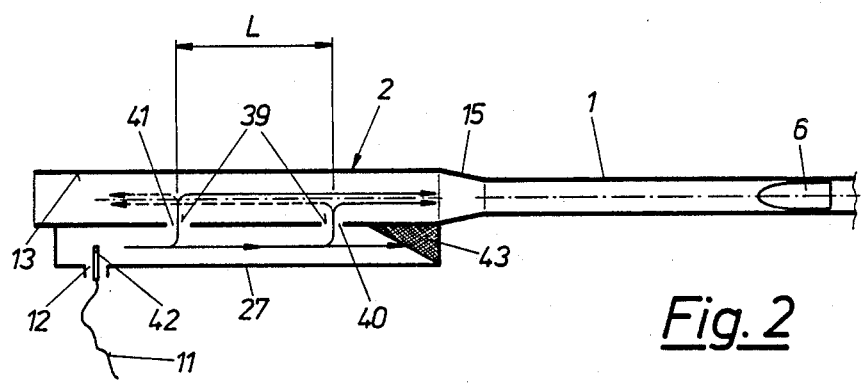
FIG. 2 is a cross-sectional view of a coupling element embodying principles of the invention and employed in connection with the apparatus of FIG. 1.

In FIG. 2, the coupling element 2 is illustrated in greater detail. Therein, is illustrated an antenna pin 42 at the end of the coaxial waveguide connector 12 which projects into the interior of a waveguide 27 formed with a rectangular cross-section. This allows an electromagnetic wave to be generated inside the waveguide 27.

As a consequence, a reflective termination by the left end wall of the waveguide 27, practically 100% of the electromagnetic wave proceeds toward the right in the waveguide 27, is divided defacto wherein as it enters into the inner region 13 of the coupling 2 via the two openings 40 and 41 which are positioned at the two spaced apart locations 39. It can be appreciated that the locations 39 are spaced apart along path of travel of the wave. Further, the voltage of the wave supplied through the openings 40 and 41 are induced by an electrical and/or magnetic field in the opening 40 and 41 and is phase shifted by 90°. Given selections of an appropriate distance L between the two openings 40 and 41, the wave parts propagating toward the right into the barrel 1 sum or add up, while the wave parts propagating to the left away from the projectile 6 cancel each other out.

Given identical propagation speed of the individual wave parts and identical phase at the openings 40 and 41, the cancellation is complete when the distance L between the openings 40 and 41, measured along the axis of the barrel, obeys the equation: $L = n \cdot \lambda + \lambda/4$, wherein n is a natural number (0, 1, 2, ...) and $\lambda$ is the wavelength of the electromagnetic wave. A reflection-free termination formed at the right end wall 43 of the waveguide 27 in FIG. 2 ensures that returning wave parts in the waveguide 27 that would disturb or influence the introduction of the electromagnetic wave or the described summation and cancellation are suppressed.

The described manner of coupling the wave to or introducing the wave into the coupling element 2 and then into the barrel 1 via the conical transition 15, assures that the wave proceeds into the barrel 1 with a high intensity toward the projectile 6. This, as a direct consequence therefrom, allows the wave reflected from the projectile to be very intense. The reflected wave is received out from the barrel in a manner which is the inverse of the manner just described above, whereby the reflected wave is divided via the openings 40 and 41 and the wave parts of the reflected wave in the waveguide 27 that propagate toward the end wall 43 cancel while the wave parts that propagate in the opposite direction sum or add up.

Figure 3:
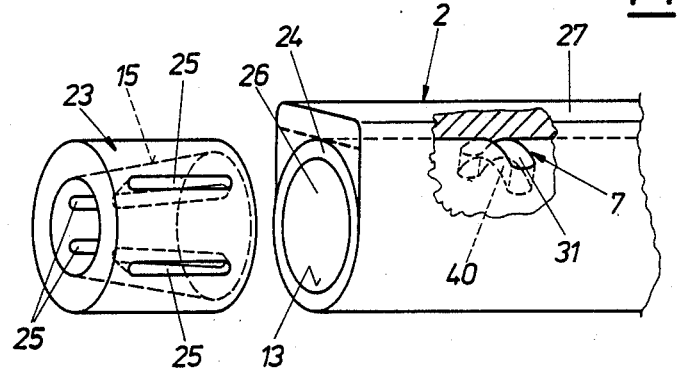
FIG. 3 is a perspective view of another coupling element embodying principles of the invention.

In FIG. 3, another embodiment of coupling element 2 is illustrated. Therein, the conical transition 15 is designed as an interchangeable member 23 that is separable from the remainder of the coupling element 2. The member 23 can be secured first to an end face 24 of the coupling element 2 and then to the muzzle 3 of the barrel 1. It can be appreciated that a great variety of methods exist for such attachments, for example, with screwing or with clamp couplings.

Formed within the wall of the conical transition member 23 are a plurality of openings 25 that communicate between the conical interior and the atmosphere to provide for release of pressure. The openings preferably constitute slotted openings, as illustrated, and are distributed about the circumference of the member 23. The openings 25 are designed so as to disturb or influence the reflected electromagnetic waves as little as possible.

As illustrated, the coupling element 2 further includes a cylindrical opening 26 therethrough that has a diameter that is greater than that of the interior of the barrel 1 and into which the openings 40 and 41 (only opening 40 is illustrated) laterally discharge the electromagnetic wave to be introduced into the barrel 1. The opening 26 is positioned concentrically with the interior of the barrel 1 and the path of the projectile 6 upon firing of same. When the coupling element 2 is viewed perpendicularly to its axis, the openings 40 and 41 preferably are essentially rectangular, whereby the narrow sides thereof are rounded as a result of end-milling cutting manufacturing. Apart from this, the openings 40 and 41 can comprise any other suitable cross-section. The cross-sections and sizes of the openings 40 and 41 can be varied to influence the coupling behavior between the waveguide 27 and the interior 13.

It can be appreciated that the opening 26 of the coupling element 2 can take on other suitable cross-sectional shapes. For example, the opening 26 can be of elliptical or rectangular cross-sectional shape, the conical transition element 15 serving to provide the necessary wave transition between the coupling element 2 and the interior of the barrel 1.

A floor for the waveguide 27 is indicated by broken lines at the end face 24 of the coupling element 2, this floor making the waveguide 27 rectangular in cross-section. Apart from the floor, any other cross-sectional shape can be employed as needed.

In FIG. 3, a closure member 31 of electrically non-conductive material and having low dielectric losses is positioned in the region of the opening 40. The closure member 31 is employed for closing off the interior of the waveguide 27 from the path traversed by a fired projectile. Thus, the closure member 31 suppresses penetration of contaminants and potential negative influences of remaining pressure waves.

Figure 4:
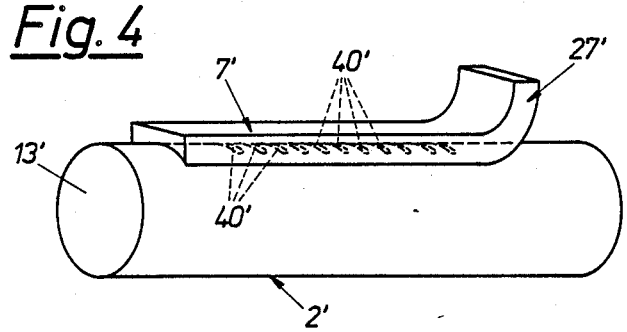
FIG. 4 is a perspective view of another coupling element embodying principles of the invention.

In FIG. 4, there is illustrated another coupling element 2' embodying principles of the invention. The coupling element 2' has a waveguide connector 7' including a plurality of slot-shaped coupling openings 40' along the circumference of the path volume 13' traversed by a fired projectile. The openings 40' are aligned perpendicularly to the axis of the barrel 1. A waveguide 27', that can include a coaxial waveguide connector (not illustrated) for connecting the waveguide 27' to a coaxial cable, includes a bend in a region of the transition into the waveguide 7'. The waveguide 7' is positioned parallel to the path 13'. The slot-shaped openings 40' are spaced apart by a distance which depends on the wavelength of the wave to be introduced into the barrel 1.

Figure 5:
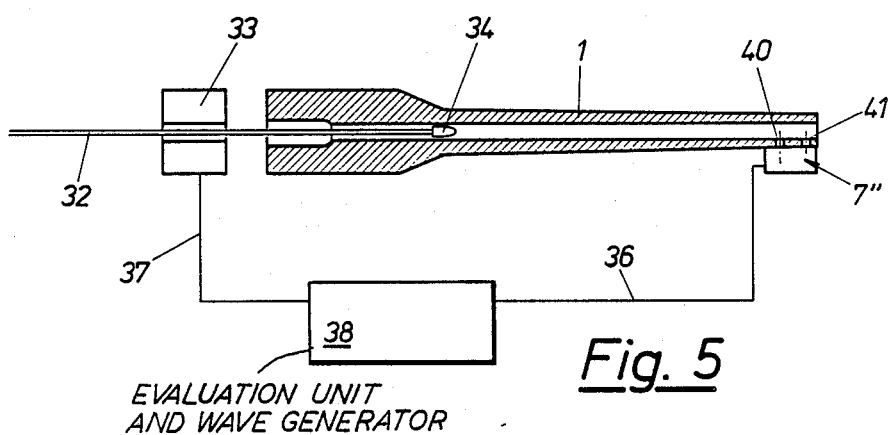
FIG. 5 is a partial cross-sectional view and block diagram of a method embodying further principles of the invention for static calibration of a ballistic characteristic evaluating apparatus.

In FIG. 5, a method and arrangement for static calibration of an evaluation is illustrated. In the method, a dummy projectile 34 operatively cooperates with a path measuring device 33 via a slide rod 32 operatively attached to the projectile 34 as the projectile 34 is moved through the barrel 1. The barrel 1 has attached thereto a waveguide connector 7". The waveguide 7" is positioned directly at lateral coupling openings 40 and 41 in the barrel 1 instead of in a separate coupling element. The supply and receipt of waves to and from, respectively, the waveguide connector 7" occurs via the cable 36, the equivalent of the coaxial cable 11 of FIG. 1. A path signal that corresponds to the position of the dummy projectile 34 in the barrel 1 of the weapon is supplied to a unit 38, the unit 38 including both the evaluation unit and the generator for generating the electromagnetic waves. The dummy projectile 34 is moved back and forth within the barrel 1 so that a precise identification is made of the correlation between the phase shift signal obtained as set forth in the discussion of FIG. 1 and the actual position of the dummy projectile 34 within the barrel 1. Accordingly, the Doppler frequency generated for a given position of the dummy projectile 34 can be identified. This extremely simple method of static calibration provides an unambiguous and very precise correlation of the projectile position and generated signals within the range of 0.1 to a few millimeters, depending on the caliber of the weapon barrel. This is true even when there are variations along the length of the barrel such as changes in the slope of the riflings therein.

In addition to the illustrated and discussed embodiments which include only single waveguide connectors, in accordance with further principles of the inventions, a further connector or a plurality of further connectors, each of which includes at least two coupling openings, can be employed, whereby the electromagnetic waves used can be of differing frequencies. Accordingly, differing levels of precision of measurement can be employed for different phases or moments in the travel of a projectile within the barrel 1.

While a preferred embodiment has been shown, modifications and changes may become apparent to those skilled in the art which shall fall within the spirit and scope of the invention. It is intended that such modifications and changes be covered by the attached claims.

We claim:

1. In a method for non-destructive identification of ballistic characteristics within a barrel of a weapon, wherein an electromagnetic wave is introduced into the barrel of the weapon via a waveguide adaptor coupled to a muzzle of the barrel, wherein a reflected electromagnetic wave is received out from the barrel after reflection off of a projectile positioned within the barrel, and wherein changes in phase relationships between the introduced and received electromagnetic waves are employed as a measure of change of position of the projectile, the steps of:
   dividing the wave to be introduced into the barrel into wave parts; and
   supplying the wave parts to at least two preselected spaced apart locations on the waveguide adaptor so that wave parts propagating into the barrel in the direction of the projectile situated therein add up and wave parts propagating in the opposite direction cancel each other out.

2. In the method of claim 1, the steps of: moving a projectile through the barrel;
   identifying the position of the projectile within the barrel; and
   identifying the relationship between projectile location and phase relationship.

3. In the method of claim 1, for static calibration, the steps of:
   moving a dummy projectile through the barrel;
   identifying the position of the dummy projectile; and
   identifying the relationship between the position of the dummy projectile and Doppler frequency of the reflected wave.

4. An apparatus for non-destructive identification of ballistic characteristics within a barrel of a weapon, wherein an electromagnetic wave is introduced into the barrel of the weapon via a waveguide adaptor coupled to a muzzle of the barrel, wherein a wave reflects off from a projectile positioned within the barrel is received from the barrel, and wherein changes in a phase relation between the introduced and received wave are employed as a measure of changes in the position of the projectile, further comprising:
   (a) means for generating the electromagnetic wave to be introduced into the barrel;
   (b) means for introducing the electromagnetic wave into the barrel and for receiving the electromagnetic wave reflected off from the projectile including a waveguide adapter coupled to a muzzle of the barrel, said waveguide adapter including at least two openings positioned therealong in preselected spaced apart relationship through which said waves are introduced into said barrel as wave parts and received from said barrel so that wave parts propagating into the barrel add up while wave parts propagating in the opposite direction cancel each other out;

(c) means for evaluating the phase relationship between the introduced and received waves coupled to the waveguide adaptor.

5. The apparatus of claim 4, wherein given identical propagation speed of the wave parts and identical phase shift at the openings, the distance between the individual openings measured along an axis of the barrel is a natural number multiple of the wavelength of the electromagnetic wave increased by one quarter of the wavelength.

6. The apparatus of claim 4, wherein the means for introducing the electromagnetic wave into the barrel includes a separate element coupled to the barrel muzzle having a cylindrical opening therethrough along a path to be traversed by a fired projectile, the opening having a diameter being larger than a diameter of the barrel, and having a conical transition recess communicating between the barrel interior and the cylindrical opening.

7. The apparatus of claim 6, wherein the waveguide adaptor includes an opening in communication between the conical transition opening and atmosphere for pressure release.

8. The apparatus of claim 4, wherein the spaced apart openings are substantially rectangular in cross-section and are in communication with a substantially rectangular waveguide, the substantially rectangular waveguide being coupled to both the means for generating the electromagnetic wave and to means for evaluating the relationship between the introduced and received waves.

9. An apparatus for identifying the position of a projectile within a barrel of a weapon, comprising:

(a) means for generating an electromagnetic wave;

(b) means for introducing said wave into said barrel, including means for dividing said wave into wave parts, some of which propagate toward said projectile and others of which propagate away from said projectile, and at least two preselected spaced apart locations along an axis of said barrel at which said wave parts are introduced into said barrel, said wave parts propagating toward said projectile adding up while said wave parts propagating away from said projectile cancelling each other out, said wave parts propagating toward said projectile reflecting back therefrom;

(c) means for receiving said electromagnetic wave after it has reflected back from said projectile; and (d) means for identifying a phase relationship between said generated wave and said received wave.

10. The apparatus of claim 9, wherein the means for introducing said wave includes two spaced apart openings through which said generated wave is divided and transmitted.

11. The apparatus of claim 10, wherein the meaning for introducing said wave includes a coupling element positioned at a muzzle of the barrel.

12. The apparatus of claim 11, wherein the means for introducing includes a waveguide connector for coupling said generated wave to said coupling element.

13. The apparatus of claim 11, wherein the coupling element and opening therein through which a fired project can pass that has a diameter that is greater than a diameter of the barrel.

14. The apparatus of claim 13, wherein the coupling element includes a transition element having a conical opening therethrough the transition element being positioned between the coupling element and the barrel so as to operatively provide a transition between the smaller diameter barrel to the larger diameter coupling element opening.

15. The apparatus of claim 14, wherein the transition element includes openings extending through a wall thereof so as to operatively vent pressure built in the transition element to atmosphere.

16. In a method for identifying the position of a projectile within a weapon barrel, the steps of:

(a) generating an electromagnetic wave;

(b) dividing said wave into wave parts, some of which propagate toward said projectile and add together others of which propagate away from said projectile and cancel each other out;

(c) using said barrel as a waveguide and introducing said wave parts that propagate toward said projectile and that add together into said barrel as an introduced wave in at least two preselected spaced apart locations along an axis of said barrel;

(d) causing said introduced wave to reflect back from said projectile as a reflected wave;

(e) dividing said reflected wave into wave parts some of which propagate toward said barrel and cancel and others of which propagate away from said barrel and add up to form a received wave;

(f) identifying a phase relationship between said generated wave and said received wave; and (g) identifying a relationship between said phase relationship and a position of said projectile within said barrel.

17. In the method of claim 16, the step of dividing said generated wave, including transmitting said generated wave through two spaced apart locations.

18. In the method of claim 17, the step of transmitting the generated wave through two spaced apart locations, including transmitting the generated wave through two openings positioned in spaced apart fashion along an axis of said barrel.

19. In the method of claim 18, wherein the openings are separated by a distance L such that L is defined by the equation $L = n \cdot \lambda + \lambda/4$ where n is a natural number and $\lambda$ is the wavelength of the generated wave.

20. In the method of claim 16, wherein the step of generating said wave includes transmitting said wave to a coupling element position at the muzzle end of the barrel via a waveguide connector.

21. In the method of claim 16, wherein the introduced wave is introduced into the barrel from outside of the muzzle end of the barrel.

* * * * *